United States Patent [19]
Yano et al.

[11] Patent Number: 5,085,561
[45] Date of Patent: Feb. 4, 1992

[54] GAS REMOVAL PUMP FOR LIQUID

[75] Inventors: Hisashi Yano, Yokohama; Junsuke Yabumoto, Atsugi; Akiharu Kitada, Kawasaki, all of Japan

[73] Assignee: Mitsubishi Oil Co., Ltd., Tokyo, Japan

[21] Appl. No.: 626,613

[22] Filed: Dec. 7, 1990

[30] Foreign Application Priority Data

Dec. 12, 1989 [JP] Japan .................. 1-320508

[51] Int. Cl.$^5$ ............................. F04B 39/04
[52] U.S. Cl. ..................... 417/313; 417/86; 418/15; 418/88; 418/DIG. 1; 55/203
[58] Field of Search ............ 417/66, 67, 86, 313; 418/15, 88, DIG. 1; 55/199, 203

[56] References Cited

U.S. PATENT DOCUMENTS

| | | | |
|---|---|---|---|
| 2,201,575 | 5/1940 | Corneil et al. | 417/67 |
| 3,290,864 | 12/1966 | Harker et al. | |
| 3,887,342 | 6/1975 | Bunnelle | 417/313 |
| 4,134,736 | 1/1979 | Hammond, Jr. | 55/199 |
| 4,622,048 | 11/1986 | Roberts et al. | 55/199 |
| 4,676,810 | 6/1987 | El-Saie et al. | 55/203 |
| 4,799,940 | 1/1989 | Millikan | |
| 4,854,831 | 8/1989 | Etemad et al. | 418/DIG. 1 |
| 4,865,632 | 9/1989 | Yano et al. | |
| 4,878,924 | 11/1989 | Yano et al. | |
| 4,900,335 | 2/1990 | Algers | 55/203 |
| 5,004,407 | 4/1991 | Hutchinson | 55/203 |

FOREIGN PATENT DOCUMENTS

| | | | |
|---|---|---|---|
| 3501852 | 1/1985 | Fed. Rep. of Germany | 418/DIG. 1 |
| 58-36606 | 8/1981 | Japan | |
| 0118590 | 6/1986 | Japan | 418/DIG. 1 |
| 1104315 | 10/1987 | Japan | |

Primary Examiner—Richard A. Bertsch
Assistant Examiner—Michael I. Kocharov
Attorney, Agent, or Firm—Locke Reynolds

[57] ABSTRACT

A gas removable pump for liquid comprising a housing having an inlet for introducing the liquid thereinto and an outlet for feeding the liquid therefrom, a drive shaft extending into the housing and having formed therein an axial bore, a rotary pump disposed within the housing, and a discharging chamber defined within the housing and separated from the rotary pump in a liquid-tight manner. The rotary pump includes a rotor secured to the drive shaft for co-rotation therewith and a plurality of cells for feeding the liquid, each cell constituting a separator for gas-rich liquid upon rotation of the rotor. A stationary shaft extends in the axial bore between the rotary pump and the discharging chamber. A connecting arrangement is provided in the drive shaft and stationary shaft for selectively connecting each cell with the discharging chamber. Also provided is an injector for ejecting into the discharging chamber the gas-rich liquid separated in the cells through the connecting arrangement.

21 Claims, 2 Drawing Sheets

GAS REMOVAL PUMP FOR LIQUID

BACKGROUND OF THE INVENTION

1. Field of the Invention

The present invention generally relates to a pump for feeding a liquid and, more particularly, to a pump having a gas removal function for removing gaseous contaminants contained in the liquid to thereby feed the liquid containing little gaseous contaminants.

2. Description of the Prior Art

In various fields of industry, a requirement exists to remove gaseous contaminants contained in a liquid which are fed by a pump. One example can be found in a chemical industry where raw materials, intermediate products or final products in the form of liquid are fed by the pump to be processed and/or stored. These liquid materials and products often contain gaseous contaminants which cause problems during feeding, processing and at the final products and should therefore be removed. Also, various lubricating oils tend to contain gaseous contaminants during use, examples thereof including oils for use in engine, gear, automatic transmission, torque converter, power steering, hydraulic actuator, turbine, compressor, quenching, rolling, metal working and traction device. Such gaseous contaminants adversely affect the lubrication and hydraulic properties and are desired to be removed.

There has been a known technique which utilizes a buoyancy of gases for removing the contaminants from the liquid. Another approach has resulted in a use of centrifugal force generated by a vortex flow of the liquid as disclosed in, for example, Japanese Patent Publicatios Nos. 44-23803 and 61-36444 and Japanese Patent Laid-Open No. 1-104315. Due to a difference in density, the gas-rich liquid having a smaller specific gravity gathers in an area around a center of the vortex flow and the liquid containing little gaseous contaminants is separated to gather in a peripheral area.

However, all of the known gas removal devices are provided separately from a pump for feeding the liquid, and nothing has hitherto been proposed toward an integration of the pump and gas removal device. To install the pump and gas removal device in different portions of feed pipes of a chemical plant or lubricating system necessarily involves not only an increased work but also an increased space for the assembly and is therefore undesirable. This is particularly important when only a limited space is available for installation, such as in an automobile engine and an automatic transmission where miniaturization is one of the essential requirements in a design.

SUMMARY OF THE INVENTION

Accordingly, an object of the invention is to provide an integrated gas removable pump which can efficiently separate gaseous contaminants from a liquid to be pumped, without a need of additional energy other than required for rotating the pump.

Another object of the invention is to provide a gas removable pump for liquid which may easily be installed in a relatively small space.

According to the present invention, a gas removable pump for liquid comprises a housing having an inlet for introducing the liquid thereinto and an outlet for feeding the liquid therefrom, a drive shaft extending into the housing and having formed therein an axial bore, a rotary pump disposed within the housing, and a discharging chamber defined within the housing and separated from the rotary pump in a liquid-tight manner. The rotary pump includes a rotor secured to the drive shaft for co-rotation therewith and a plurality of cells for feeding the liquid, each cell constituting a separator for gas-rich liquid upon rotation of the rotor. A stationary shaft extends in the axial bore between the rotary pump and the discharging chamber. A connecting means is provided in the drive shaft and stationary shaft for selectively connecting each cell with the discharging chamber. Also provided is an ejecting means for ejecting into the discharging chamber the gas-rich liquid separated in the cells through the connecting means.

In a preferred embodiment of the invention, the connecting means includes a removal passage formed in the stationary shaft to extend along the axis thereof and a radial passage extending from each cell to the inner surface of the drive shaft defining the axial bore. A first groove may extend between the removal passage and the peripheral surface of the stationary shaft and have an opening at the peripheral surface for communication with the radial passage, the opening having a certain width in the circumferential direction. The ejecting means may comprise a larger-diametered portion of the drive shaft through which a radial bore extends to communicate with the removal passage, whereby the rotation of the drive shaft generates a suction force at the removal passage.

Other objects, features and advantages of the present invention will be apparent from the following description of the preferred embodiments thereof when taken in conjunction with the accompanying drawings.

DESCRIPTION OF THE PREFERRED EMBODIMENTS

Figure 1:
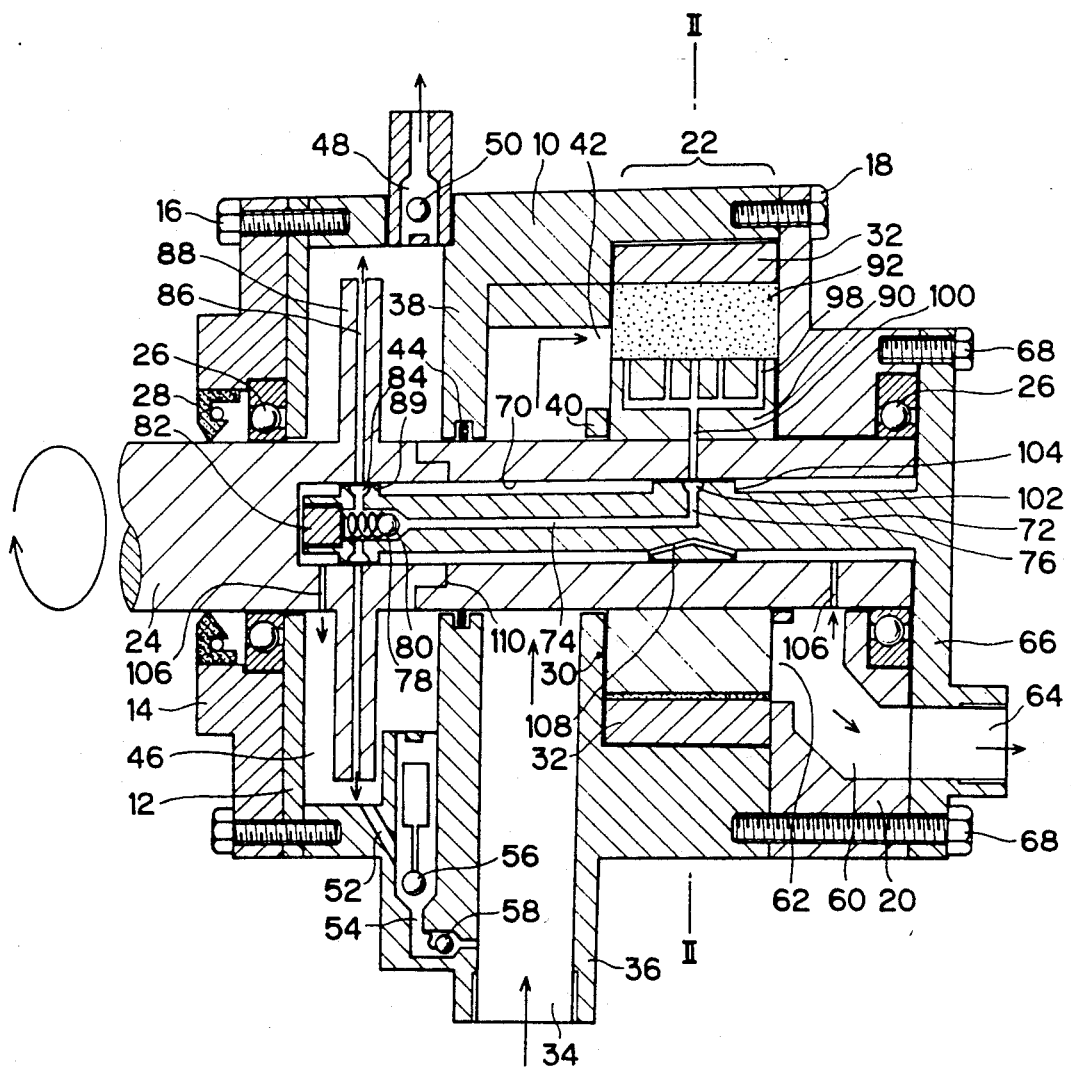
FIG. 1 is a longitudinally sectioned schematic view illustrating a gas removable pump for liquid according to an embodiment of the invention.

Referring to FIG. 1 of the drawings, a gas removable pump for liquid according to a preferred embodiment of the present invention has a generally cylindrical housing 10 having opposite open ends, one of the ends, i.e. the left-hand end in FIG. 1, being sealingly closed by a disk-shaped cover 12. A cap 14 rests on the axially outer surface of cover 12, and these cap and cover are fixed to the housing 10 by bolts 16. Fastened to the right-hand end of the housing by bolts 18 is a head cover 20 which defines a discharge opening for a rotary pump 22 as described below. A drive shaft 24 extends into the housing 10 along the axis thereof through the cap 14 and cover 12 and terminates at the end of head cover 20. The cap 14 and head cover 20 have recesses within which are received bearings 26 for supporting the shaft 24. A suitable seal 28 is provided around the shaft 24 at the outer end of cap 14. The rotary pump 22, which comprises a vane pump in the illustrated embodiment, is disposed in the housing 10 adjacent the right-hand end thereof. Specifically, the rotary pump comprises a rotor 30 coaxially attached to the shaft 24 for co-rotation therewith and a casing 32 secured to the inner surface of the housing in such a manner that the casing is eccentric relative to the shaft 24, as in the conventional rotary pump.

An inlet 34 is defined between a projection 36 and a partition wall 38 of the housing 10 to introduce a liquid such as an oil thereinto. A wall 40 extends radially inward at a position corresponding to the projection 36 for defining an intake opening 42 of the rotary pump 22. The partition wall 38 has an O-ring 44 fitted around the shaft 24 and defines in cooperation with the cover 12 a discharging chamber 46 which is sealingly separated from the inlet 34 and communicates with the outside of the housing 10 through a hole 48 having a valve 50. A drain hole 52 is formed in the wall of housing 10 at a position opposite to the hole 48 to connect the chamber 46 with a return passage 54 which extends to the inlet 34. A float valve 56 and a check valve 58 are provided in the return passage 54 as in an usual drainage system.

The head cover 20 is formed with an outlet 60 extending between a discharge opening 62 of the pump 22 and an exit 64 in an end flange 66 which is secured to the head cover 20 by bolts 68. The drive shaft 24 has formed therein an axial bore 70 extending from the right-hand end of the shaft to the discharging chamber 46, in which is received a stationary shaft 72 that is integral with the end flange 66. Formed along an axis of the stationary shaft 24 is a removal passage 74 to connect a first groove 76 with an expanded end portion 78 of passage 74 where a check valve 80 adapted to normally close the removal passage 74 is accommodated before the portion 78 is closed by a plug 82. A second groove 84 is formed radially outward of the end portion 78 along the entire circumference of the stationary shaft 72 to communicate the portion 78 with radial bores 86 in a flange 88 which is formed by enlarging a part of the drive shaft 24. Thus, the second groove 84 and radial bores 86 always communicate with each other. The flange 88 has a diameter greater than that of an annular body 90 of the rotor 30. A circumferential projection 89 is formed on the outer surface of the stationary shaft 72 and extends to a position closely adjacent the inner surface of drive shaft 24 for providing a substantially liquid-tight seal there between.

Figure 2:
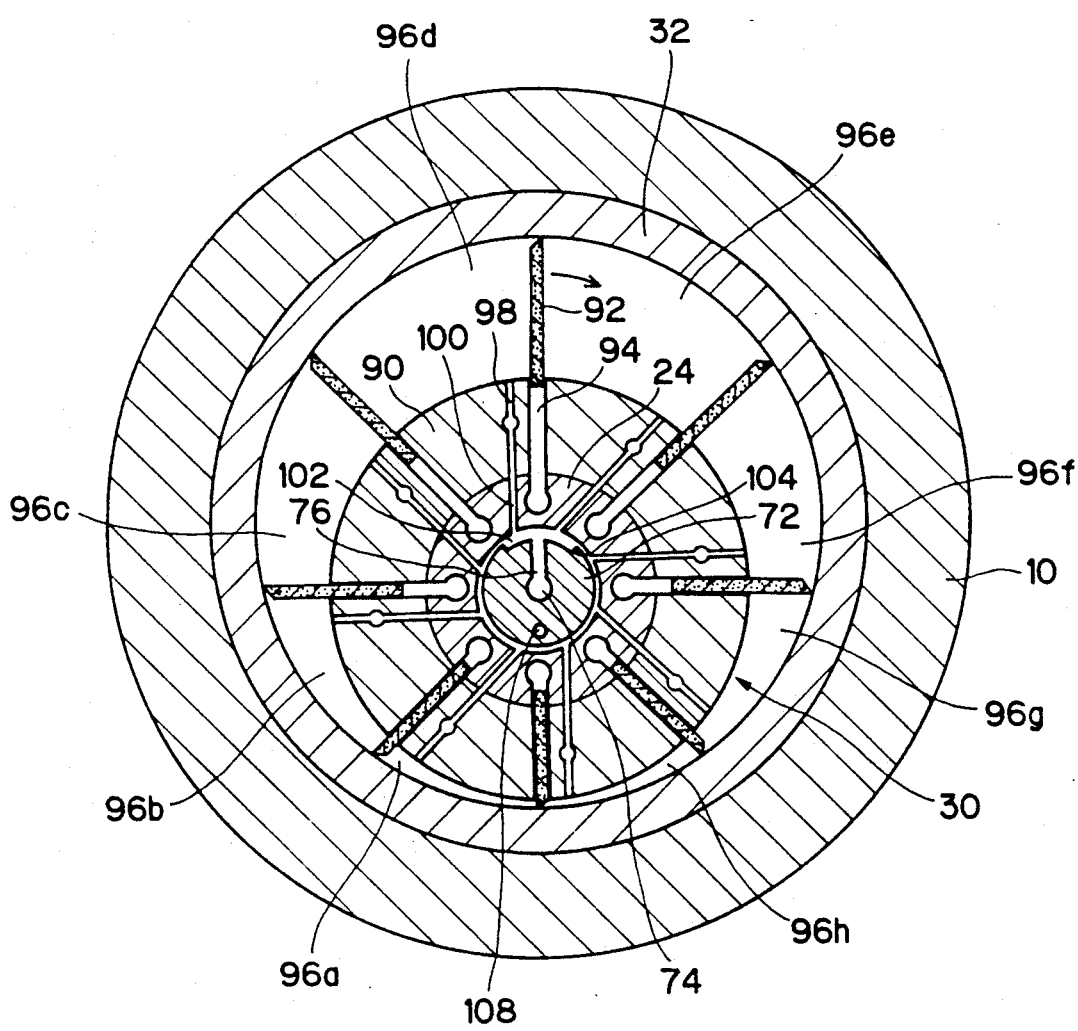
FIG. 2 is a cross sectional view taken along line II—II of FIG. 1.

As shown in FIG. 2, the rotor 30 comprises the annular body 90 formed integrally with the shaft 24 and a plurality of vanes 92 which are slidably received in radial holes 94 formed in the annular body 90 and shaft 24. The vanes 92 are urged radially outward by elastic means (not shown) in the holes 94 so that the outer ends thereof are always in contact with the inner surface of casing 32 to thereby define cells 96a to 96h which vary their volume as the annular body 90 rotates. It is to be noted that these structures are well known in the art.

Formed in the annular body 90 are a number of orifices 98 each of which opens into the cell 96. In the illustrated example, five orifices 98 axially spaced from each other open into each cell 96 and are combined together to form a common passage 100 which extends through the body 90 and shaft 24 to the inner surface of the latter where an opening 102 of first groove 76 in the stationary shaft 72 approximates. The opening 102 is defined in a projection 104 similar to the projection 89 and extends in a circumferential direction by a predetermined angle, i.e. about 90 degrees in the illustrated example. Accordingly, the common passage 100 for each cell 96 communicates with the opening 102 only during a certain phase of rotation of the shaft 24 and rotor 30. In FIG. 2 the common passages for the cells 96d and 96e are aligned or communicate with the opening 102, the cell 96d being at the end of intake phase while the cell 96e is at the beginning of compression phase. It is generally preferable to set the position and circumferential width of the opening 102 in such a manner that it corresponds to either the intake or compression phase or both of these phases of the cells. The orifices 98 in each cell are positioned adjacent the leading vane 92 on the forward side in the rotational direction.

Two small passages 106 are formed through the drive shaft 24 to connect the axial bore 70 with the outlet 60 and the discharging chamber 46, respectively. Another small passage 108 is provided in the projection 104 at the opposite side of the groove 76. All these passages are provided for the purpose of lubrication which is particularly necessary at the projections 89 and 104 in order to ensure smooth rotation of the shaft 24 relative to the stationary shaft 72.

The drive shaft 24 is a two-part structure and is assembled together at a spline 110 after the pump 22 and flange 88 are received within the housing 10 from the opposite open ends thereof.

When the shaft 24 is rotated by an external drive source (not shown) to rotate the rotor 30, the liquid such as an oil containing gaseous contaminants flows from the inlet 34 into the cells 96 of the pump 22. The liquid in the rotating cell 96 is subjected to a centrifugal force, whereby the liquid containing gaseous contaminants, i.e. gas-rich liquid, having small density is separated and gathers near the outer surface of annular body 90. More particularly, the gas-rich liquid tends to gather in a portion adjacent the vane 92 of forward side in the rotating direction. The rotational movement of drive shaft 24 also creates a centrifugal force at the outer open ends of radial bores 86 so that a suction force is generated in the removal passage 74 to open the check valve 80. This suction force prevails over a similar force acting in the cell 96 because of the difference in diameters of the flange 88 and the annular body 90. Accordingly, the gas-rich liquid around the annular body in each cell is sucked into the orifices 98 to be ejected in the discharging chamber 46 via the removal passage 74 and the radial bores 86 when the common passage 100 communicates with the opening 102. In FIG. 2, the gas-rich liquid in the cells 96d and 96e are being discharged.

The gases are finally discharged outside of the housing 10 through the hole 48, while the liquid component in the ejected material collects on the bottom wall of the chamber 46 for drainage via the drain hole 52 to flow back into the inlet 34. On the other hand, the liquid containing little gaseous contaminants is forced out of the housing 10 via the discharge opening 62 by a delivery pressure of the pump 22, the liquid being fed through the outlet 60 and the exit 64.

As described above, the pump according to the invention enables to efficiently remove gaseous contaminants from the liquid to be pumped and therefore unnecessitates providing a gas removing device separately from the pump. Consequently, it becomes possible to save an installation space which is very valuable for miniaturizing an entire device, such as an automobile engine, in connection with which the present pump is to be used. Further, assembly work of such entire device can be reduced because of the integrated structure of the present pump. Still further, the gas removal function is achieved by using the rotational movement of drive shaft of the rotary pump, and no additional energy is thus required.

Although the present invention has been described with reference to its preferred embodiments, many modifications and alterations may be made within the spirits of the invention. Particularly, it should be understood that an application of the invention is not limited to the vane pump as described herein, and it is also applicable to other types of rotary pump having a rotor and cells.

What is claimed is:

1. A gas removable pump for liquid comprising:
   a housing having an inlet for introducing a liquid containing gaseous contaminants thereinto and an outlet for feeding the liquid therefrom;
   a drive shaft extending into said housing, said drive shaft having formed therein an axial bore;
   a rotary pump disposed within said housing between said inlet and said outlet, said rotary pump including a rotor secured to said drive shaft for co-rotation therewith and a plurality of vanes extending outward from the rotor defining separator cell means for separating the liquid containing gaseous contaminants passing therethrough into a gas-rich liquid and a gas-poor liquid by centrifugal force upon rotation of said drive shaft;
   a discharging chamber for receiving said gas-rich liquid defined within said housing, said discharging chamber being separated from said rotary pump by a partition;
   a stationary shaft extending in said axial bore between said rotary pump and said discharging chamber;
   connecting means formed in said drive shaft and said stationary shaft for selectively connecting each said separator cell means with said discharging chamber; and
   ejecting means for ejecting into said discharging chamber said gas-rich liquid separated by said separator cell means.

2. A gas removable pump for liquid as claimed in claim 1, wherein said shaft has inner and peripheral surfaces and wherein said connecting means includes a removal passage formed in said stationary shaft to extend along the axis of said shaft, said connecting means further including a radial passage extending from said separator cell means to the inner surface of said drive shaft defining said axial bore.

3. A gas removable pump for liquid as claimed in claim 2, wherein said connecting means further comprises a first groove extending between said removal passage and the peripheral surface of said stationary shaft, said groove having an opening at the peripheral surface for communication with said radial passage.

4. A gas removable pump for liquid as claimed in claim 3, wherein said opening of said groove has a position and a circumferential width such that said radial passage communicates with said opening when said separator cell means is in an intake phase.

5. A gas removable pump for liquid as claimed in claim 3, wherein said opening of said groove has a position and a circumferential width such that said radial passage communicates with said opening when said separator cell means is in a compression phase.

6. A gas removable pump for liquid as claimed in claim 3, wherein said opening of said groove has a position and a circumferential width such that said radial passage communicates with said opening when said separator cell means is in intake and compression phases.

7. A gas removable pump for liquid as claimed in claim 3, wherein said connecting means further comprises a radial bore formed through said drive shaft and a second groove in said stationary shaft for communicating said removal passage with said radial bore.

8. A gas removable passage as claimed in claim 7, wherein said second groove is formed along the entire circumference of said stationary shaft.

9. A gas removable pump for liquid as claimed in claim 7, further comprising first and second circumferential projections formed on said stationary shaft having outer surfaces closely adjacent the inner surface of said drive shaft to provide a substantially liquid-tight seal between said opening of said first groove and said radial passage and between said second groove and said radial bore, respectively.

10. A gas removable pump for liquid as claimed in claim 7, wherein said drive shaft has a larger-diametered portion in said discharging chamber, said radial bore extending through said larger-diametered portion, and wherein said ejecting means comprises the outer end of said radial bore whereby the rotation of said drive shaft generates a suction force at said removal passage.

11. A gas removable pump for liquid as claimed in claim 10, further comprising a check valve disposed in said removal passage for preventing a reverse flow of said gas-rich liquid.

12. A gas removable pump for liquid as claimed in claim 2, wherein said rotary pump further includes a casing secured to the inner surface of said housing eccentrically relative to said drive shaft.

13. A gas removeable pump for liquid as claimed in claim 12, wherein said rotor of said rotary pump comprises an annular body around said drive shaft and a plurality of vanes supported by said annular body and urged radially outward to be in contact at the oter ends thereof with the inner surface of said casing, said separator cell means being defined by said casing, said annular body and two of said vanes adjacent each other.

14. A gas removable pump for liquid as claimed in claim 13, wherein said radial passage opens into said separator cell means at a position near one of said vanes of a forward side in the rotational direction.

15. A gas removable pump for liquid as claimed in claim 14, wherein said radial passage comprises a plurality of axially spaced orifices each having an opening to said separator cell means and a common passage connecting said orifices with the inner surface of said drive shaft.

16. A gas removable pump for liquid as claimed in claim 1, wherein said housing includes fastened thereto a head cover for defining a discharge opening of said rotary pump and said outlet.

17. A gas removable pump for liquid as claimed in claim 16, wherein said stationary shaft has an end flange fixed to said head cover.

18. A gas removable pump for liquid as claimed in claim 1, wherein the wall of said housing defining said discharging chamber has formed therein a hole for discharging the gases outside of said housing and a drain hole for drainage of liquid component.

19. A gas removable pump for liquid as claimed in claim 18, further comprising a return passage connecting said drain hole with said inlet of said housing.

20. A gas removable pump for liquid as claimed in claim 19, further comprising a check valve and a float valve disposed in said return passage.

21. A gas removable pump as claimed in claim 1, wherein said drive shaft comprises two sections joined together by a spline.

* * * * *